United States Patent Office 3,192,266
Patented June 29, 1965

3,192,266
17α - ETHYNYL - 17β - HYDROXY-A-NOR-B-HOMO-ESTRANES AND THEIR PROCESS OF PREPARATION
Georges Muller, Nogent-sur-Marne, and André Poittevin, Les Lilas, France, assignors, by mesne assignments, to Roussel-UCLAF, S.A., Paris, France, a corporation of France
No Drawing. Filed Nov. 1, 1961, Ser. No. 149,222
Claims priority, application France, June 16, 1961, 865,200
5 Claims. (Cl. 260—586)

The present invention relates to new 17α-ethynyl-17β-hydroxy-A-nor-B-homo-estranes and their process of preparation. It particularly relates to 17α-ethynyl-A-nor-B-homo-5ξ,10ξ-estrane-17β-ol-3,6-dione of the formula:

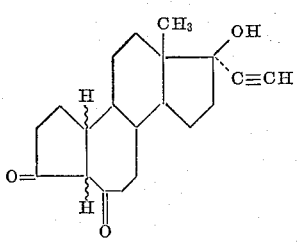

which β-diketone probably exists in one of its $\Delta^{3(5)}$ or $\Delta^{5(6)}$ enolic forms.

In copending commonly-assigned United States Patent 3,040,093, patented June 19, 1962, certain A-nor-B-homo-$\Delta^{5(10)}$-estrenes are described. These estrenes have an anabolic action while being almost devoid of an androgenic action.

The 17α - ethynyl - 17β-hydroxy-A-nor-homo-estranes are derived from the said estrenes. They differ, however, from the preceding estrenes in that the product of the invention, while a physiologically active compound having hormonal activity, acts as an oral progestogen and as an inhibitor of hypophysial gonadotrophines and is particularly utilizable as an oral progestogen.

It is an object of the present invention to obtain 17α-ethynyl-A-nor-B-homo-5ξ,10ξ-estrane-17β-ol-3,6-dione of the formula:

which β-diketone probably exists in one of its $\Delta^{3(5)}$ or $\Delta^{5(6)}$ enolic forms.

A further object of the invention is the obtention of A-nor-B-homo-5ξ,10ξ-estrane-3,6,17-trione having the formula:

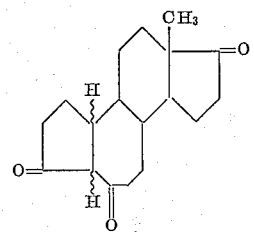

said estranetrione probably being in one of its enolic forms selected from the group consisting of its $\Delta^{3(5)}$ enolic form and its $\Delta^{5(6)}$ enolic form.

A still further object of the invention is the development of a process for the production of 17α-ethynyl-A-nor-B-homo-estrane-17β-ol-3,6-dione, which β-ketone probably exists in one of its $\Delta^{3(5)}$ or $\Delta^{5(6)}$ enolic forms.

Another object of the invention is the obtention of 17α-ethynyl-17β-hydroxy-A-nor-B-homo-5ξ,10ξ-estranes having usefulness as an oral progestogen and as an intermediate in steroid synthesis.

These and other objects of the invention will become more apparent as the description thereof proceeds.

The compounds of the invention are 17α-ethynyl-A-nor-B-homo-5ξ,10ξ-estrane-17β-ol-3,6-dione of the formula:

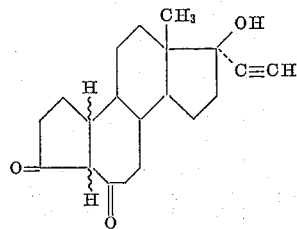

in its tautomeric forms, selected from the group consisting of the $\Delta^{3(5)}$ enolic form and the $\Delta^{5(6)}$ enolic form.

The spatial orientation of either of the hydrogen atoms in the 5 position and in the 10 position has not yet been determined.

The compound, as well as the estranetrione intermediate, is obtained in the form of a β-ketone and appears to stabilize itself into one of its $\Delta^{3(5)}$ or $\Delta^{5(6)}$ enolic forms.

The two enolic forms are strongly chelated by a hydrogen bond in such a manner that the infra-red spectrum does not show a hydroxyl band.

The exact structure of each of the two forms can not be determined precisely.

The process of preparation of the 17α-thynyl-17β-hydroxy-A-nor-B-homo-estranes comprises principally the following steps:

(a) Selective saturation of the double bond in the 5(10) position of A-nor-B-homo-$\Delta^{5(10)}$-estrene-3,6,17-trione;

(b) Selective ethynylation in the 17 position of the A-nor-B-homo-5ξ,10ξ-estrane-3,6,17-trione.

The following flow diagram of Table I shows the course of the reaction in the preparation of the compounds of the invention.

TABLE I

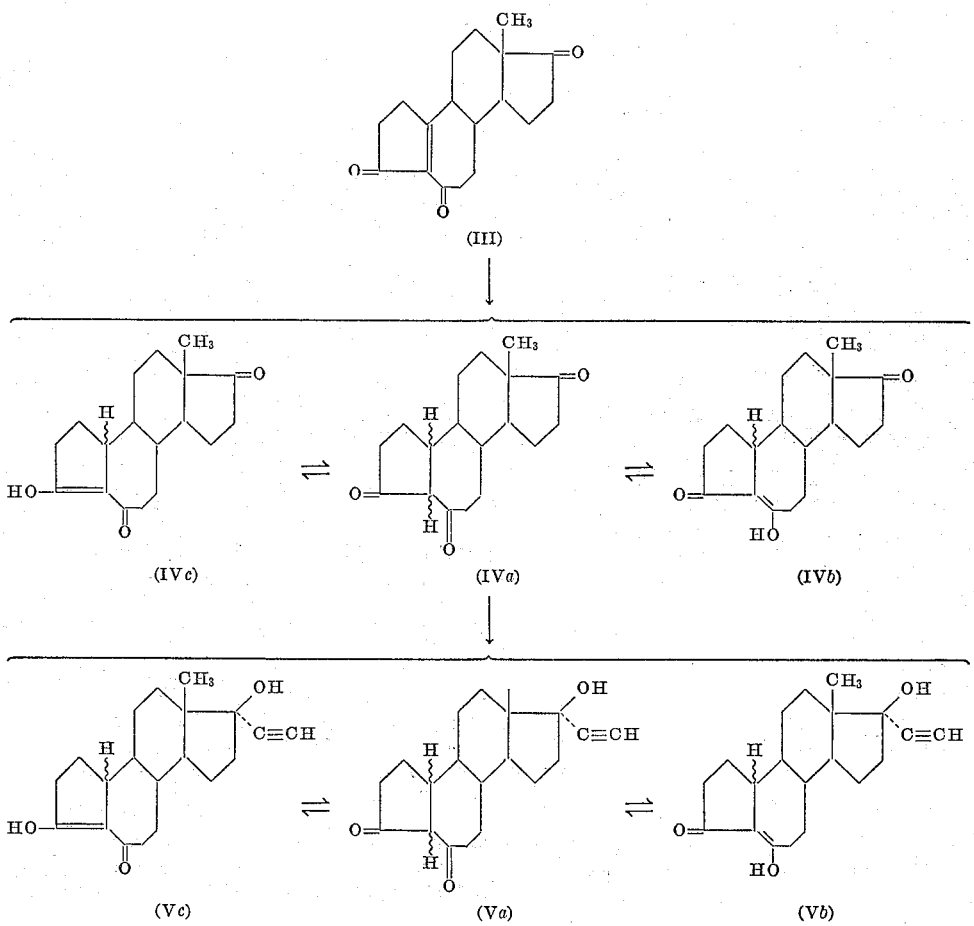

(III)

(IVc)   (IVa)   (IVb)

(Vc)   (Va)   (Vb)

17α-ethynyl-A-nor-B-homo-5ξ,10ξ-estrane-17β-ol-3,6-dione is prepared following the reaction scheme of Table I by a process which consists essentially in subjecting A-nor-B-homo-Δ$^{5(10)}$-estrene-3,6,17-trione, III, to the selective action of an alkali metal mixed hydride such as potassium borohydride as a hydrogenation agent in the presence of a low molecular weight hydroxylated organic solvent, preferably a lower alkanol such as methanol, in an acidic media, preferably a lower alkanoic acid such as acetic acid, at a temperature between about 50° C. and about 10° C. in order to form A-nor-B-home-5ξ,10ξ-estrane-3,6,17 trione, in one of its enolic forms. This compound theoretically exists in three tautomeric forms, IV (a, b, c), however the β-diketonic form (IVa) has not been isolated in fact. This compound is dissolved in an inert organic solvent and ethynylated selectively in the 17 position by the action of acetylene in an alkali media such as an alkali metal lower alkanolate in the corresponding lower alkanol. Preferably potassium t-butylate in t-butanol is employed. The reaction occurs at about room temperature. 17α-ethynyl-A-nor-B-homo-5ξ,10ξ-estrane-17β-ol-3,6-dione, V, is obtained in the form of identical theoretical tautomers a, b, c. Here again, however, the β-diketonic form (Va) has not been isolated in fact.

It is surprising to note the selectivity of the reduction reaction which does not cause reduction of other parts of the molecule. Likewise, the ethynylation reaction, in surprising fashion, ethynylates only in the 17 position, the other ketones of the molecule not being attacked.

The starting compound, A-nor-B-homo-Δ$^{5(10)}$-estrene-3,6,17-trione, III, is prepared according to the process described in copending, commonly-assigned U.S. Patent 3,040,093, patented June 19, 1962, by subjecting a Δ$^{5(10)}$-estrene-3,17-dione to ozonization, reducing the ozonization product to obtain a 5,10-seco-estrane-3,5,10,17-tetraone, and cyclizing this latter product by heating in an acidic media to recover said A-nor-B-homo-Δ$^{5(10)}$-estrene-3,6,17-trione.

The invention is equally relative to the utilization of A-nor-B-homo-5ξ,10ξ-estrane-3,6,17-trione, IV, and to that of 17α-ethynyl-A-nor-B-homo-5ξ,10ξ-estrane-17β-ol-3,6-dione, V, as intermediates for the obtention of compounds of the A-nor-B-homo series of steroids, based on techniques and methods well known to those skilled in the art and extending, for example, to the introduction into the molecule by microbiological or chemical means of other substituents, or even to the transformation of the ethynyl group into the acetyl group according to known processes of synthesis of pregnanes.

The following example is given as indicative and enables a better comprehension of the invention. It is obvious, however, to one skilled in the art that other expedients may be employed.

The temperatures are indicated in degrees centigrade. The melting points are determined on the Kofler block and are the instantantous melting points.

EXAMPLE

*Preparation of 17α-ethynyl-A-nor-B-homo-5ξ,10ξ-estrane-17β-ol-3,6-dione (compound V)*

STEP A.—REDUCTION OF A-NOR-B-HOMO-Δ$^{5(10)}$-ESTRENE-3,6,17-TRIONE (COMPOUND III)

3.3 gm. of A-nor-B-homo-Δ$^{5(10)}$-estrene-3,6,17-trione, III, prepared according to U.S. Patent 3,040,093, patented June 19, 1962, and having a melting point of 176° C. and a specific rotation $[\alpha]_D^{20} = +116° \pm 3°$ (c.=0.5% in chloroform) were dissolved in 33 cc. of methanol and 6.6 cc. of acetic acid. While maintaining the temperature between +1 and +4° C., 1.6 gm. of potassium borohydride were added. The mixture was agitated for a period of twenty minutes, diluted with methylene chloride, washed with water, dried over magnesium sulfate and evaporated to dryness under vacuum. The residue was redissolved in 30 cc. of a 70% aqueous methanolic solution and allowed to crystallize. 1.48 gm., being a 45% yield, of A-nor-B-homo-5ξ,10ξ-estrane-3,6,17-trione, IV, having a melting point of 114° C. and a specific rotation $[\alpha]_D^{20} = +150° \pm 3°$ (c.=0.5% in chloroform) was thus obtained.

The product, which is new, occurs in the form of small, colorless, rectangular prisms, and is soluble in ether, acetone, benzene and chloroform, and slightly soluble in isopropyl ether.

Analysis ($C_{18}H_{24}O_3$): Molecular weight=288.37. Calculated: C, 74.97%; H, 8.4%. Found: C, 74.5%; H, 8.4%.

The triketone, IV, appears to stabilize itself in one of its enolic forms, IV (b or c), as it is shown from the infra-red absorption spectrum.

STEP B.—ETHYNYLATION OF A-NOR-B-HOMO-5ξ,10ξ-ESTRANE-3,6,17-TRIONE, IV 1.04 gm. of A-nor-B-homo-5ξ,10ξ-estrane-3,6,17-trione, IV, obtained according to the preceding step was dissolved in 5 cc. of dioxane. 20 cc. of a normal solution of potassium t-butylate in t-butanol were added, and a current of acetylene was passed through the solution for a period of seven hours at a temperature of 22° C. 5 cc. of a 50% aqueous solution of acetic acid were added. The mixture was diluted with water and vacuum filtered. The filter cake was washed with water, dried at 100° C. and 0.94 gm. of a product was obtained. The dried product was dissolved in 20 cc. of methylene chloride, subjected to chromatography over 80 gm. of silica and eluted with methylene chloride containing 4% acetone. The eluates were evaporated to dryness. The residue was crystallized from 50 cc. of isopropyl ether in order to furnish 0.582 gm., being a yield of 51%, of 17α-ethynyl-A-nor-B-homo-5ξ,10ξ-estrane-17β-ol-3,6-dione, V, having a melting point of 152–154° C. and a specific rotation $[\alpha]_D^{20} = +1°$ (ethanol).

This product, which has not yet been described, occurs in the form of small, colorless crystals, and is insoluble in water, soluble in ether, very soluble in alcohol, benzene and chloroform.

Analysis ($C_{20}H_{26}O_3$): Molecular weight=314.11. Calculated: C, 76.4%; H, 8.34%. Found, C, 76.3%; H, 8.3%.

The diketone, V, appears to stabilize itself in one of its enolic forms, b or c, as is shown by the infra-red absorption spectrum.

The above example is illustrative of the invention. It is not, however, to be deemed as limitative. It is obvious to one skilled in the art that the nature of the reactants, the solvents, the temperatures of reaction, etc., can be varied without departing from the body of the invention and the scope of the appended claims.

We claim:
1. The enolic form of 17α-ethynyl-A-nor-B-homo-5ξ,10ξ-estrane-17β-ol-3,6-dione of the formula

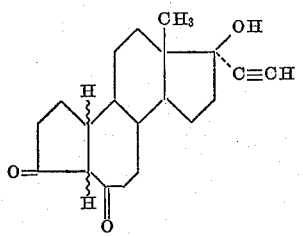

having a melting point of 152–154° C.

2. The enolic form of A-nor-B-homo-5ξ,10ξ-estrane-3,6,17-trione of the formula

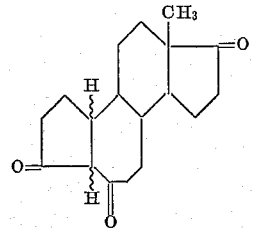

having a melting point of 114° C.

3. A process of producing the enolic form of 17α-ethynyl-A-nor-B-homo - 5ξ,10ξ - estrane-17β-ol-3,6-dione of the formula

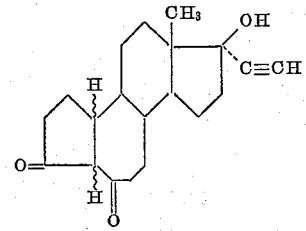

having a melting point of 152–154° C. which comprises the steps of subjecting an A-nor-B-homo-$\Delta^{5(10)}$-estrene-3,16,17-trione having the formula

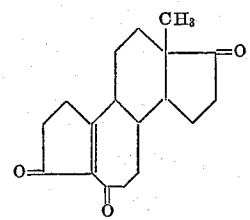

to a selective reduction by the action of an alkali metal borohydride in the presence of a lower alkanol, in a lower alkanoic acid medium, subjecting the resulting A-nor-B-homo-5ξ-estrane-3,6,17-trione in the form of its enolic form of the formula

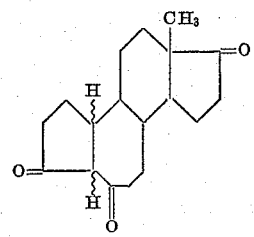

having a melting point of 114° C. to a selective ethynynlation by the action of acetylene in the presence of an alkali metal lower alkanolate in a lower alkanol solvent and recovering said enolic form of 17α-ethynyl-A-nor-B-homo-5ξ,10ξ-estrane-17β-ol-3,6-dione having a melting point of 152°–154° C.

4. A process according to claim 3, wherein the selective reduction is effected by the action of potassium borohydride in methanol containing acetic acid.

5. A process according to claim 3, wherein the alkali metal lower alkanolate is potassium t-butylate and the lower alkanol solvent is t-butanol.

References Cited by the Examiner
UNITED STATES PATENTS
2,732,405   1/56   Dodson et al. _____ 260—586

LEON ZITVER, *Primary Examiner.*